(12) United States Patent
Moto et al.

(10) Patent No.: US 10,768,438 B2
(45) Date of Patent: *Sep. 8, 2020

(54) OPTICAL ELEMENT DRIVING DEVICE

(71) Applicant: TDK TAIWAN CORP., Taoyuan (TW)

(72) Inventors: Ichitai Moto, Taoyuan (TW); Yi-Liang Chan, Taoyuan (TW)

(73) Assignee: TDK TAIWAN CORP., Yangmei, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,936

(22) Filed: May 3, 2019

(65) Prior Publication Data

US 2019/0258076 A1 Aug. 22, 2019

Related U.S. Application Data

(63) Continuation of application No. 15/668,182, filed on Aug. 3, 2017.

(Continued)

(30) Foreign Application Priority Data

Aug. 4, 2016 (TW) .................................. 105124733

(51) Int. Cl.
*G02B 27/64* (2006.01)
*G02B 7/08* (2006.01)
(Continued)

(52) U.S. Cl.
CPC .......... *G02B 27/646* (2013.01); *G02B 7/023* (2013.01); *G02B 7/08* (2013.01); *G02B 7/09* (2013.01);
(Continued)

(58) Field of Classification Search
CPC . G02B 7/023; G02B 7/04; G02B 7/08; G02B 7/09; G02B 7/10; G02B 7/102; G02B 27/646
(Continued)

(56) References Cited

U.S. PATENT DOCUMENTS 8,810,714 B2    8/2014   Seol et al.
8,842,382 B2    9/2014   Park et al.
(Continued)

FOREIGN PATENT DOCUMENTS

CN    104902149 A    9/2015
CN    105593758 A    5/2016
(Continued)

OTHER PUBLICATIONS

Office Action dated Dec. 31, 2019 in CN Application No. 201710656272.0.

*Primary Examiner* — Nicholas R. Pasko
(74) *Attorney, Agent, or Firm* — Muncy, Geissler, Olds & Lowe, PC

(57) ABSTRACT

An optical element driving device is provided, including a fixed part including a base; a movable part including a holder for carrying an optical element, a first driving mechanism configured to drive the holder to move along a first direction with respect to the base, and a position sensing assembly including a magnetic element and a magnetic field sensing element in corresponding positions and configured to sense the amount of displacement of the holder along the first direction with respect to the base, wherein the position sensing assembly and the magnetic element do not overlap with each other when viewed along a direction perpendicular to the first direction.

20 Claims, 14 Drawing Sheets

Related U.S. Application Data

(60) Provisional application No. 62/421,592, filed on Nov. 14, 2016.

(51) Int. Cl.
| | | |
|---|---|---|
| *H02K 11/215* | (2016.01) | |
| *G02B 7/09* | (2006.01) | |
| *G03B 5/04* | (2006.01) | |
| *G03B 13/36* | (2006.01) | |
| *H02K 41/035* | (2006.01) | |
| *G02B 7/02* | (2006.01) | |
| *H04N 5/225* | (2006.01) | |
| *G01D 5/14* | (2006.01) | |

(52) U.S. Cl.
CPC ............... *G03B 5/04* (2013.01); *G03B 13/36* (2013.01); *H02K 11/215* (2016.01); *H02K 41/0356* (2013.01); *H04N 5/2254* (2013.01); *G01D 5/145* (2013.01); *G03B 2205/0015* (2013.01); *G03B 2205/0069* (2013.01)

(58) Field of Classification Search
USPC ....... 359/557, 694, 696, 703, 704, 813, 814, 359/822, 823, 824, 825, 826
See application file for complete search history.

(56) References Cited

U.S. PATENT DOCUMENTS

| | | | |
|---|---|---|---|
| 2014/0205274 A1 | 7/2014 | Wu et al. | |
| 2015/0015729 A1* | 1/2015 | Kasamatsu | G02B 27/646 348/208.11 |
| 2015/0029387 A1* | 1/2015 | Kawai | H04N 5/23296 348/347 |
| 2015/0253583 A1* | 9/2015 | Cho | H04N 5/23287 348/360 |
| 2016/0241787 A1* | 8/2016 | Sekimoto | H04N 5/2254 |
| 2016/0342069 A1 | 11/2016 | Inoue | |
| 2018/0031859 A1* | 2/2018 | Gomyo | G02B 7/09 |
| 2018/0039161 A1* | 2/2018 | Moto | G02B 7/023 |
| 2018/0136483 A1* | 5/2018 | Chen | H04N 5/2254 |
| 2018/0188476 A1* | 7/2018 | Hu | H04N 5/2254 |
| 2018/0188527 A1* | 7/2018 | Hu | G01D 5/12 |

FOREIGN PATENT DOCUMENTS

| | | |
|---|---|---|
| TW | 200739232 A | 10/2007 |
| TW | 201331697 A | 8/2013 |
| TW | 201604639 A | 2/2016 |

* cited by examiner

OPTICAL ELEMENT DRIVING DEVICE

CROSS REFERENCE TO RELATED APPLICATIONS

This application is a Continuation of application Ser. No. 15/668,182, filed on Aug. 3, 2017, which claims the benefit of U.S. Provisional Application No. 62/421,592, filed on Nov. 14, 2016, and Taiwan Patent Application No. 105124733, filed on Aug. 4, 2016, the entirety of which are incorporated by reference herein.

BACKGROUND OF THE INVENTION

Field of the Invention

The invention relates to an optical element driving device, and in particular to an optical element driving device that can move an optical element using electromagnetic force.

Description of the Related Art

Many handheld devices such as mobile phones and tablet PCs are equipped with digital camera functionality as a basic requirement nowadays, and this is made possible thanks to the miniaturization of optical element driving devices. In addition, handheld devices are usually equipped with other functions, such as autofocus (AF), optical image stabilization (OIS), and so on.

In a conventional optical element driving device including the autofocus (AF) function, in order to sense the position of the holder carrying the optical element (e.g. a lens) on an image-capturing optical axis, a circuit substrate with a magnetic field sensor (e.g. a Hall sensor) thereon is provided adjacent to a lateral side of the holder to sense the magnetic field strength change from a magnetic element (e.g. a magnet) mounted on the holder. However, the circuit substrate and the magnetic field sensor disposed on the lateral side of the holder will increase the size of the optical element driving device, and thus adversely affect its prospects for miniaturization, and also limit the diameter of the lens.

In another conventional optical element driving device including the optical image stabilization (OIS) function, in order to sense the position of the holder carrying the lens on an image-capturing optical axis, a magnetic field sensor (e.g. a Hall sensor) is mounted on the movable part (e.g. the frame) of the optical element driving device to sense the magnetic field strength change from the magnetic element (e.g. a magnet) mounted on the holder. However, the magnetic field sensor will cause the weight of the movable part to increase, and thus more energy is required to move the movable part. In addition, a circuit that corresponds to the magnetic field sensor on the movable part is needed, making the finished product harder to manufacture.

Thus, to design an optical element driving device that can improve the aforementioned problems has become an important issue.

BRIEF SUMMARY OF THE INVENTION

Embodiments of the invention provide an optical element driving device, including a fixed part, a movable part, a first driving mechanism, and a position sensing assembly. The fixed part includes a base. The movable part includes a holder for carrying an optical element. The first driving mechanism is configured to drive the holder to move along a first direction with respect to the base. The position sensing assembly includes a magnetic element and a magnetic field sensing element in corresponding position and is configured to sense the amount of displacement of the holder along the first direction with respect to the base. The magnetic pole direction of the magnetic element is different from the first direction.

In some embodiments, the magnetic field sensing element determines the amount of displacement of the holder with respect to the base by sensing changes in the direction of the magnetic field from the magnetic element.

In some embodiments, the magnetic field sensing element is disposed on the base to sense the amount of displacement of the holder along the first direction with respect to the base. The first direction is parallel to an optical axis of the optical element.

In some embodiments, the magnetic element and the magnetic field sensing element do not overlap when viewed along the first direction.

In some embodiments, the first driving mechanism includes a first driving coil and a driving magnetic element in corresponding positions. The magnetic field sensing element and the magnetic element are partially overlapping when viewed from a direction that is perpendicular to the first direction In some embodiments, the base is substantially rectangular. The driving magnetic element is located on a side of the base, and the magnetic element is located at a corner of the base.

In some embodiments, the base is substantially rectangular. The driving magnetic element is located at a corner of the base, and the magnetic element is located on a side of the base.

In some embodiments, the first driving mechanism includes a first driving coil and a driving magnetic element in corresponding positions. The magnetic pole direction of the driving magnetic element is different from that of the magnetic element.

In some embodiments, the optical element driving device further includes a second driving mechanism including a second driving coil and the driving magnetic element in corresponding positions. The second driving coil is disposed on the fixed part. The driving magnetic element is disposed on the movable part. The second driving mechanism is configured to drive the movable part to move along a second direction with respect to the base, wherein the second direction is different from the first direction.

In some embodiments, the fixed part further includes a circuit substrate disposed on the base. The second driving coil and the magnetic field sensing element are disposed on the circuit substrate.

In some embodiments, the fixed part further includes an image sensing module including a circuit substrate and an image sensing element. The image sensing element and the magnetic field sensing element are disposed on the circuit substrate.

In some embodiments, the first driving mechanism includes a first driving coil and a driving magnetic element in corresponding positions. The holder has a protrusion on the outer peripheral surface thereof. The first driving coil is disposed on a side of the protrusion. The protrusion is located between the magnetic element and the magnetic field sensing element.

In some embodiments, the position sensing assembly further includes a plurality of magnetic elements and a plurality of magnetic field sensing elements in corresponding positions. The magnetic field sensing elements are arranged in a second direction different from the first direction. The magnetic field sensing elements are respectively configured to sense the amount of displacement of a plurality of portions of the holder in the first direction with respect to the base.

In some embodiments, the magnetic field sensing element is a Giant Magneto Resistance (GMR) sensor or a Tunneling Magneto Resistance (TMR) sensor.

In some embodiments, the first driving mechanism further includes a plurality of driving magnetic elements. The driving magnetic elements near the magnetic element and the driving magnetic elements away from the magnetic element have different structure.

Embodiments of the invention also provide an optical element driving device, including a fixed part, a movable part, a first driving mechanism, and a position sensing assembly. The fixed part includes a base. The movable part includes a holder for carrying an optical element. The first driving mechanism includes a first driving coil and a driving magnetic element in corresponding positions and is configured to drive the holder to move along a first direction with respect to the base. The position sensing assembly includes a magnetic element and a magnetic field sensing element in corresponding positions and is configured to sense the amount of displacement of the holder along the first direction with respect to the base. The magnetic pole direction of the magnetic element is different from the magnetic pole direction of the driving magnetic element.

In some embodiments, the magnetic pole direction of the driving magnetic element is different from the first direction.

Embodiments of the invention also provide an optical element driving device, including a base, a holder, a driving mechanism, and a position sensing assembly. The holder is configured to carry an optical element. The driving mechanism is configured to drive the holder to move along a first direction with respect to the base. The position sensing assembly includes a magnetic element and a magnetic field sensing element in corresponding positions. The magnetic element is disposed on the holder. The magnetic field sensing element is disposed on the base and configured to sense the magnetic element's magnetic field strength changes perpendicular to an optical axis of the optical element to determine the amount of displacement of the holder along the first direction with respect to the base. The first direction is parallel to the optical axis.

In some embodiments, the magnetic field sensing element includes a package body having a top surface and a mounting surface opposite to each other, and the mounting surface is connected to the base. The magnetic field sensing element is configured to sense the magnetic element's magnetic field strength changes parallel to the top surface.

In some embodiments, the magnetic element and the magnetic field sensing element do not overlap when viewed along the first direction.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
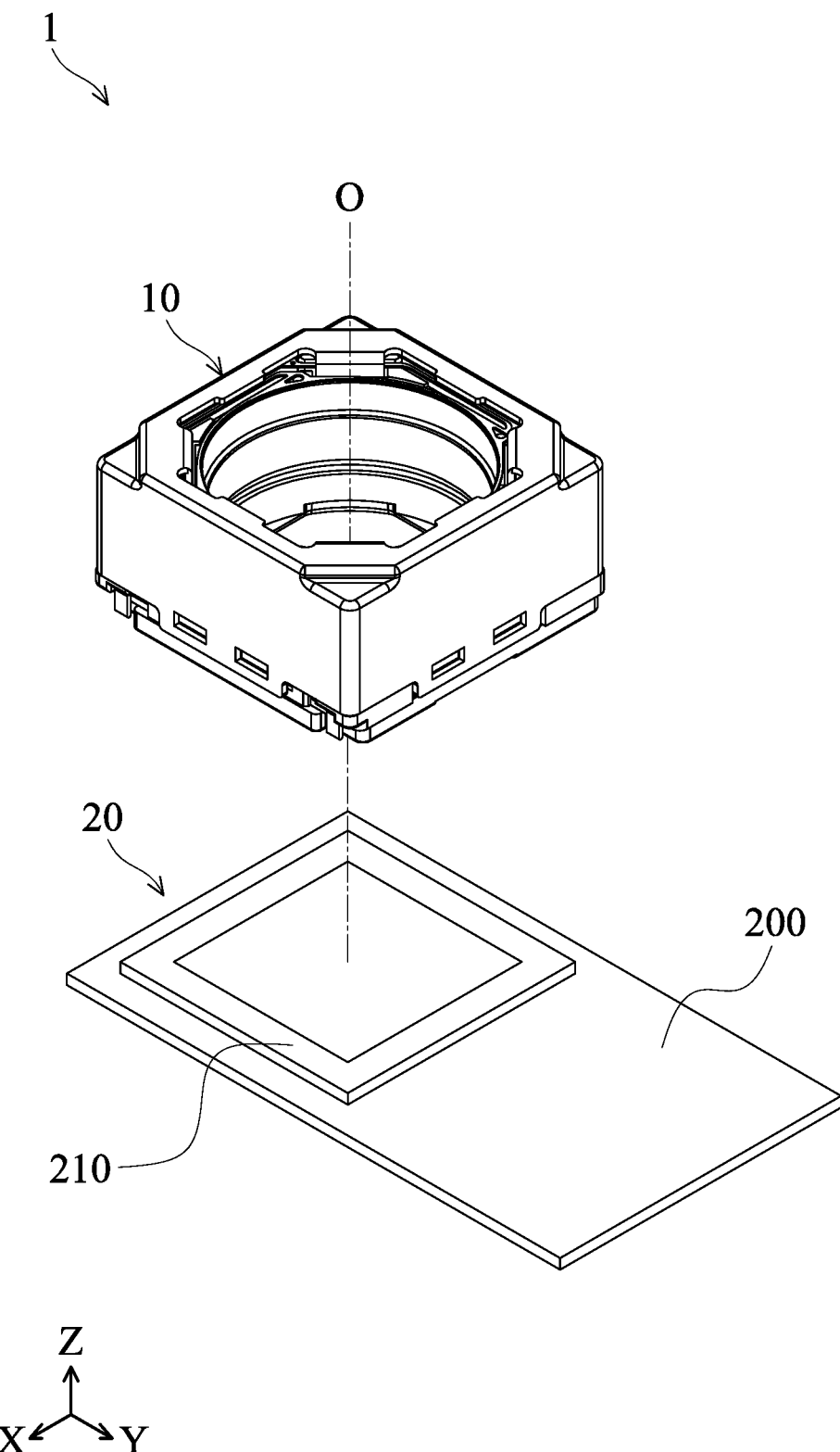
FIG. 1 is a partial exploded view of an optical element driving device in accordance with some embodiments of the invention.

The making and using of the embodiments of an optical element driving device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Referring to FIG. 1, an optical element driving device 1 according to some embodiments may be provided, for example, inside an electronic device such as a camera, a mobile phone, or a tablet PC. The optical element driving device 1 includes an optical element driving module 10 and an image sensing module 20. The optical element driving module 10 is used to carry an optical element including, for example, a lens, mirrors, and/or a light source. For ease of explanation, the carried optical element is only represented by a lens in the following descriptions. Moreover, the optical element driving module 10 can drive the lens to move along its optical axis O (i.e. the Z-axis direction in the figure) with respect to the image sensing module 20 positioned on a side of the optical element driving module 10, thereby achieving autofocus (AF). The image sensing module 20 includes a circuit substrate 200 and an image sensing element 210 mounted on the circuit substrate 200. The circuit substrate 200 may be a flexible printed circuit board (FPC) and the image sensing element 210 may be a charge-coupled device (CCD) or a complementary metal-oxide-semiconductor (CMOS) sensor.

Figure 2:
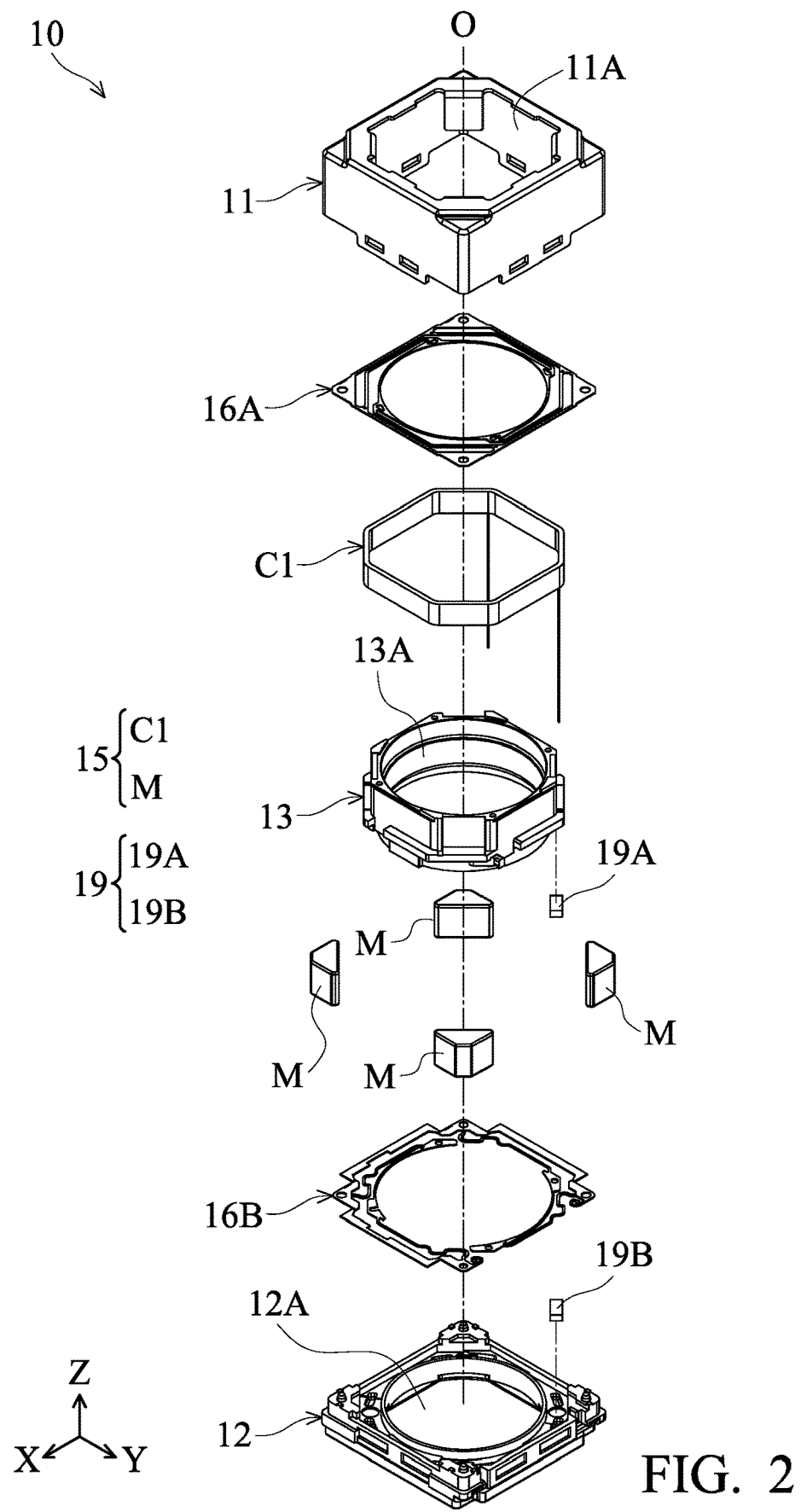
FIG. 2 is an exploded view of the optical element driving module in FIG. 1.

Referring to FIG. 2, the optical element driving module 10 according to some embodiments includes a top casing 11, a base 12, a holder 13, a driving mechanism 15, multiple elastic members 16A, 16B, and a position sensing assembly 19.

The top casing 11 has a hollow cubic structure and can be combined with the base 12 that is substantially rectangular for receiving other parts/elements of the optical element driving module 10 as described above. The top casing 11 has an opening 11A through which the lens (not shown) in the optical element driving module 10 can capture light from the outside. The opening 11A and another opening 12A on the base 12 correspond to each other and are located on the optical axis O of the lens. Accordingly, the lens and the image sensing element 210 of the image sensing module 20 on a side (near the base 12) of the optical element driving module 10 can perform image focusing in the direction of the optical axis O.

The holder 13 has a through hole 13A for receiving the lens. In accordance with some embodiments, the through hole 13A forms a thread structure corresponding to another thread structure on the periphery of the lens, such that the lens can be screwed into the through hole 13A. In accordance with some embodiments, the shape of the holder 13 is quadrilateral, octagonal, or other optional polygons.

The (electromagnetic) driving mechanism 15 includes a driving coil C1 and multiple (e.g. four) driving magnetic elements M (e.g. magnets). The driving coil C1 is wound around the outer peripheral surface of the holder 13. In the embodiments of FIG. 2, the driving magnetic elements M are trapezoidal (or triangular) and disposed at four inner corners of the top casing 11 to correspond to the driving coil C1. In some embodiments, the driving magnetic elements M are elongated and disposed on four inner sidewalls of the top casing 11.

With the above configuration, when a driving signal (e.g. current) from an external driving unit (not shown) is supplied to the driving coil C1, the driving coil C1 can act with the magnetic field from the driving magnetic elements M to generate an electromagnetic force to drive the holder 13 and the lens therein to move along the optical axis O (first direction) with respect to the base 12, thereby performing image focusing.

Moreover, the holder 13 may be disposed between the elastic members 16A and 16B (for example, two metal sheets) comprising an elastic material and movably suspended at the center of the optical element driving module 10 by the elastic members 16A and 16B. For example, the outer peripheral portion and inner peripheral portion of the elastic member 16A are respectively connected to the upper sides of the top casing 11 and holder 13, and the outer peripheral portion and inner peripheral portion of the elastic member 16B are respectively connected to the lower sides of the base 12 and holder 13. Thus, the elastic members 16A and 16B can provide a buffer capacity for the displacement of the holder 13 along the optical axis O and avoid damage to the holder 13 and the lens therein.

Furthermore, in order to achieve the autofocus (AF) function of the optical element driving module 10, the position sensing assembly 19 includes a magnetic element 19A and a magnetic field sensing element 19B respectively mounted on the holder 13 and the base 12 and corresponding to each other. The magnetic element 19A may be a magnet. The magnetic field sensing element 19B may be a Giant Magneto Resistance (GMR) sensor or a Tunneling Magneto Resistance (TMR) sensor that can be used to detect the magnetic field strength change caused by movement of the magnetic element 19A on the holder 13, thereby determining the amount of displacement of the holder 13 and the lens therein along the optical axis O with respect to the base 12. In other words, when the holder 13 moves back and forth along the optical axis O, the magnetic field sensing element 19B can detect the change in the magnetic field strength (i.e. the change in magnetic flux density) from the magnetic element 19A, so as to determine the position of the holder 13 on the optical axis O.

Figure 4:
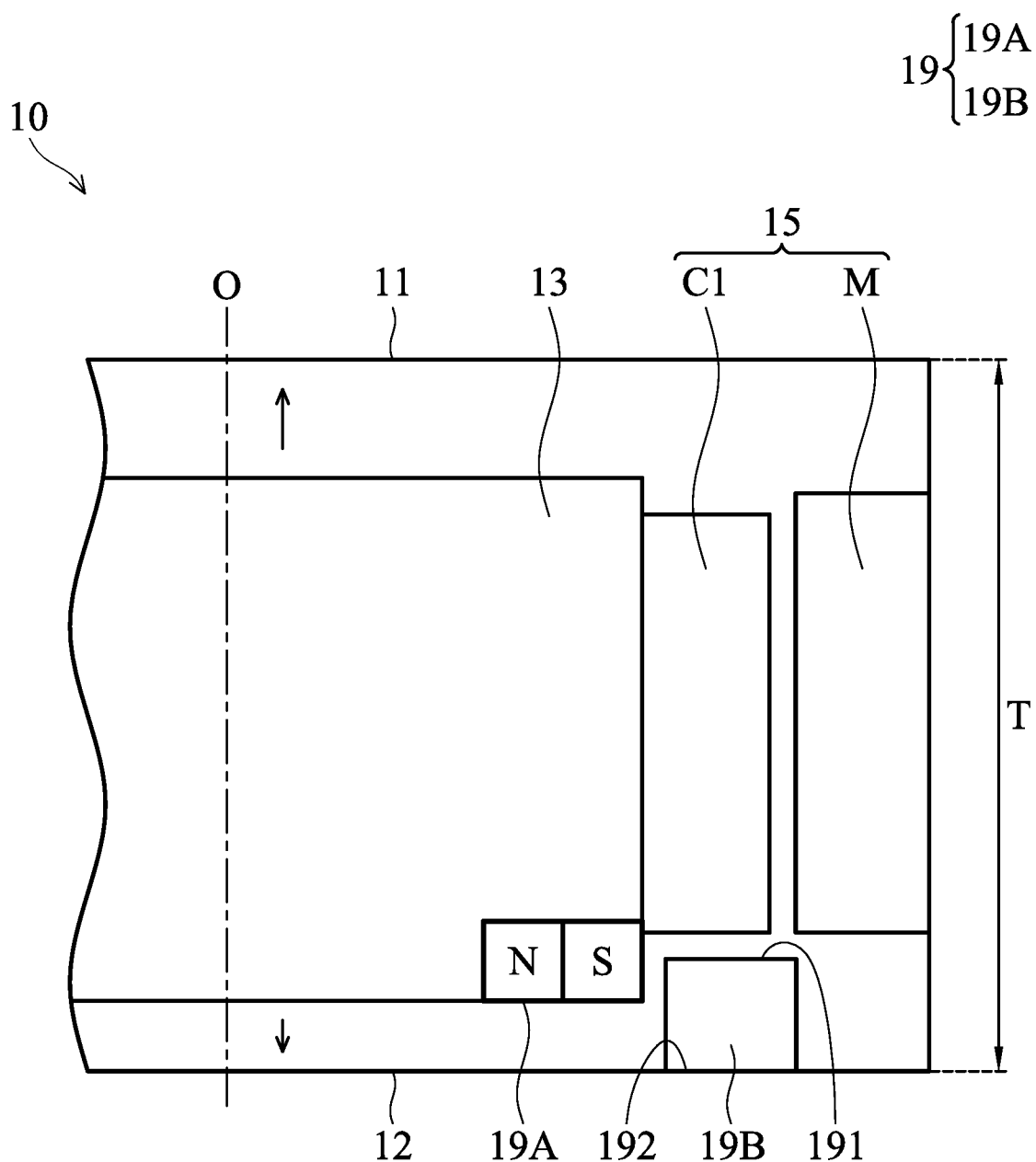
FIG. 4 is a schematic view showing the relative position of the magnetic element and the magnetic field sensing element of the position sensing assembly in accordance with some embodiments of the invention.

In accordance with some embodiments, the magnetic field sensing element 19B is a surface mount device (SMD) and includes a package body having a top surface 191 and a mounting surface 192 opposite to each other, wherein the mounting surface 192 is used to connect the base 20 (see FIG. 4).

In the embodiments of FIG. 2, the magnetic field sensing element 19B may be mounted on a circuit substrate (e.g. a FPC; not shown), and the circuit substrate is affixed to the base 12. However, in some embodiments, electrical circuits may also be formed directly on the surface of the base 12, and the magnetic field sensing element 19B is mounted on the base 12 and electrically connected to the electrical circuits. Alternatively, the surface of the base 12 may form a recess for receiving the magnetic field sensing element 19B.

In addition, the circuit substrate described above may electrically connect to the driving coil C1 on the holder 13 via the elastic members 16A and/or 16B. Accordingly, the external driving unit (not shown) can further control the movement of the holder 13 along the optical axis O based on the sensing result of the magnetic field sensing element 19B, thereby achieving autofocus (AF).

In the embodiments of FIG. 2, as the magnetic field sensing element 19B for sensing the position of the holder 13 on the optical axis O is disposed on the base 12 or the circuit substrate on the base 12 rather than disposed on an additional circuit substrate provided on the lateral side of the holder 13, the miniaturization of the optical element driving device 1 can be implemented easily, or the diameter of the lens can be increased.

Figure 3:
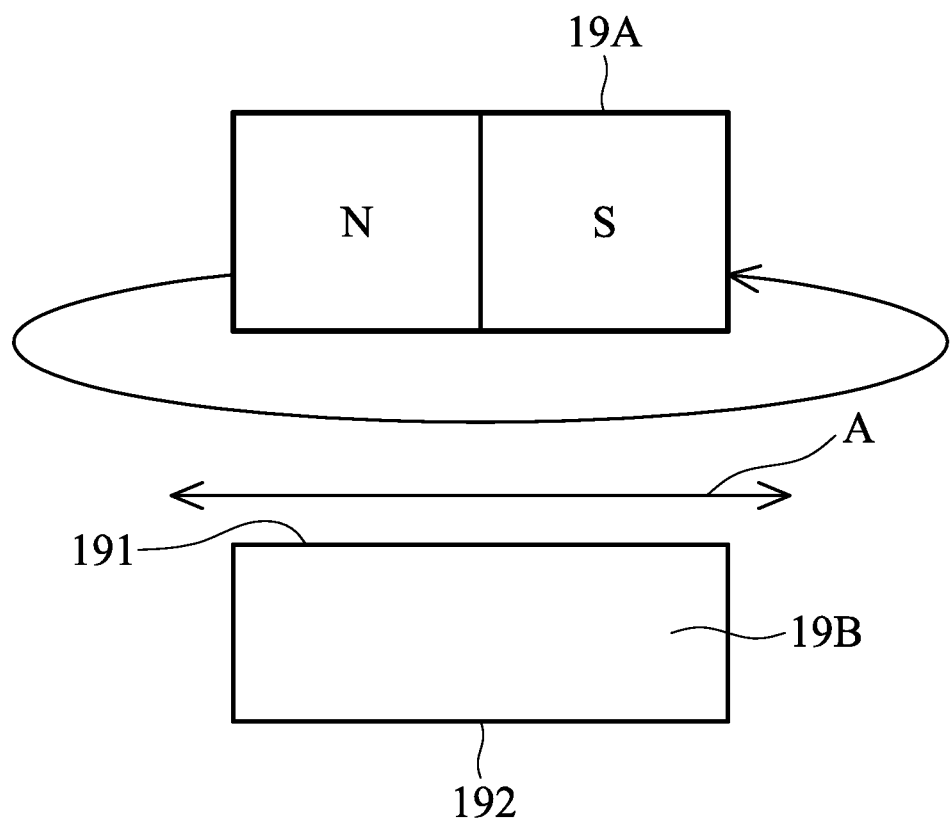
FIG. 3 is a schematic view showing the direction of changes in the magnetic field strength detected by the magnetic field sensing element in FIG. 2.

Note that the magnetic field sensing element 19B using a TMR sensor or a TMR sensor also has the following advantages: The sensing sensitivity of the GMR sensor or TMR sensor is several times the sensing sensitivity of the traditional Hall sensor. In addition, the GMR sensor or TMR sensor may also sense or detect the magnetic element 19A's magnetic field strength changes parallel to the top surface 191 of the magnetic field sensing element 19B (the double arrow A depicted in FIG. 3 represents the direction of changes in the magnetic field strength that can be detected by the magnetic field sensing element 19B), that is, the GMR sensor or TMR sensor can sense the magnetic element 19A's magnetic field strength changes perpendicular to the optical axis O (see FIGS. 3 and 4), thereby determining the amount of displacement of the holder 13 along the optical axis O with respect to the base 12.

It should be appreciated that the direction of changes in the magnetic field strength detected by the magnetic field sensing element 19B is parallel to the top surface 191 of its package body (i.e. perpendicular to the optical axis O), and thus, although the magnetic element 19A on the holder 13 and the magnetic field sensing element 19B are not aligned well or not overlapped (FIG. 4) in the direction of the optical axis O (i.e. the Z-axis direction), the magnetic field sensing element 19B can still detect the change in the magnetic field strength caused by movement of the magnetic element 19A along the optical axis O, so as to determine the amount of displacement of the magnetic element 19A and the holder 13 along the optical axis O with respect to the base 12. As a result, not only the problem wherein the magnetic field sensing element 19B may not precisely detect the changes in the magnetic field strength from the magnetic element 19A caused by assembly tolerance can be avoided, also the height T of the optical element driving module 10 is reduced, thereby achieving thinner device.

Conversely, the direction of changes in the magnetic field strength which can be detected by the traditional Hall sensor is perpendicular to its top surface, and thus the assembly tolerance between the traditional Hall effect sensor and the magnetic element 90 is strictly limited (i.e. the traditional Hall sensor and the magnetic element 90 can only be aligned with each other).

Figure 5:
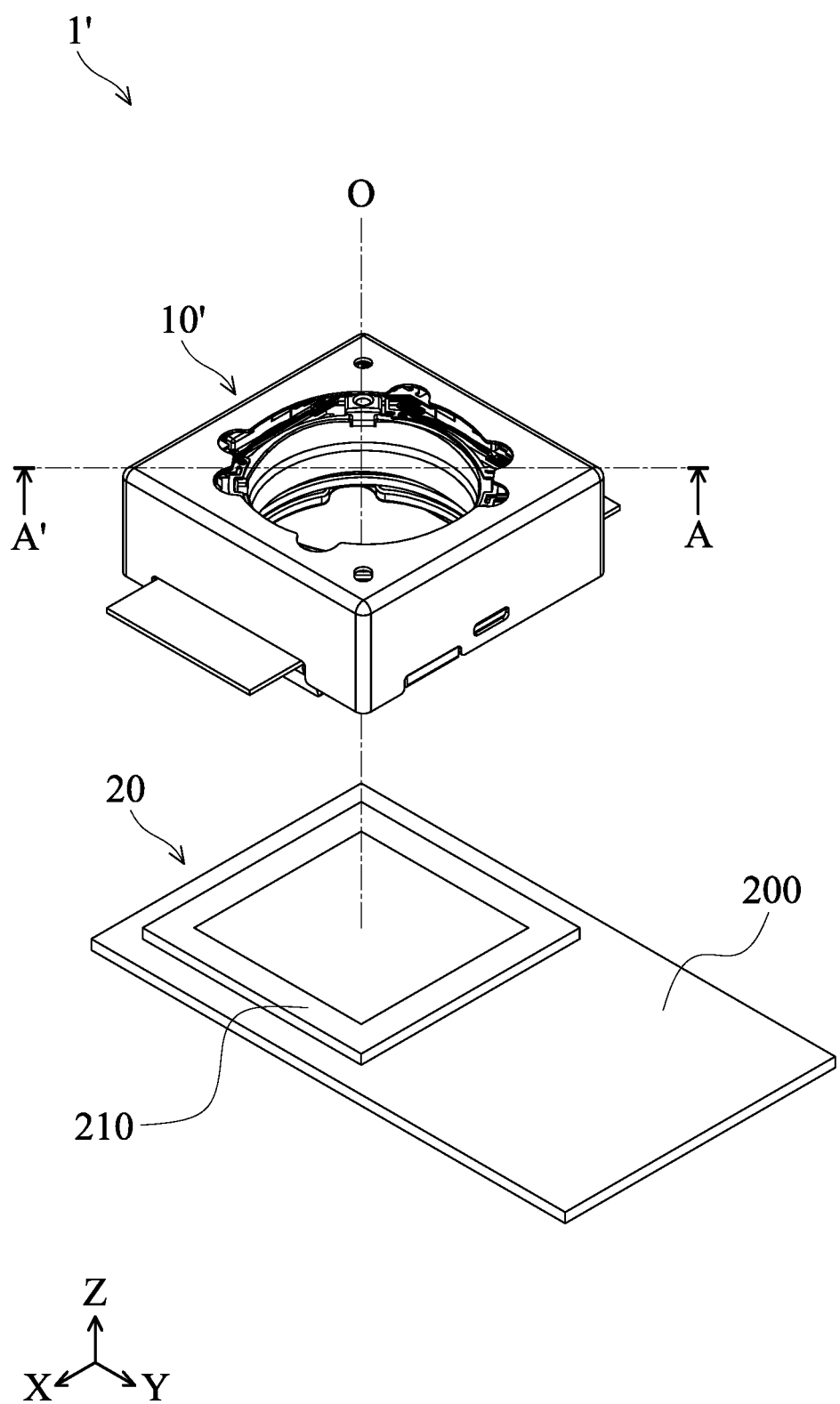
FIG. 5 is a partial exploded view of an optical element driving device in accordance with some embodiments of the invention.

Next, referring to FIG. 5 which is a partial exploded view of an optical element driving device 1' in accordance with other embodiments of the invention. The optical element driving device 1' differs from the optical element driving device 1 of the above embodiments in that the optical element driving module 10' of the optical element driving device 1' also includes an optical image stabilization (OIS) mechanism which may drive a movable part and the lens to move on a plane (i.e. the XY plane in the figure) perpendicular to the optical axis O to carry out optical shake compensation, so that the image quality can be improved.

Figure 6:
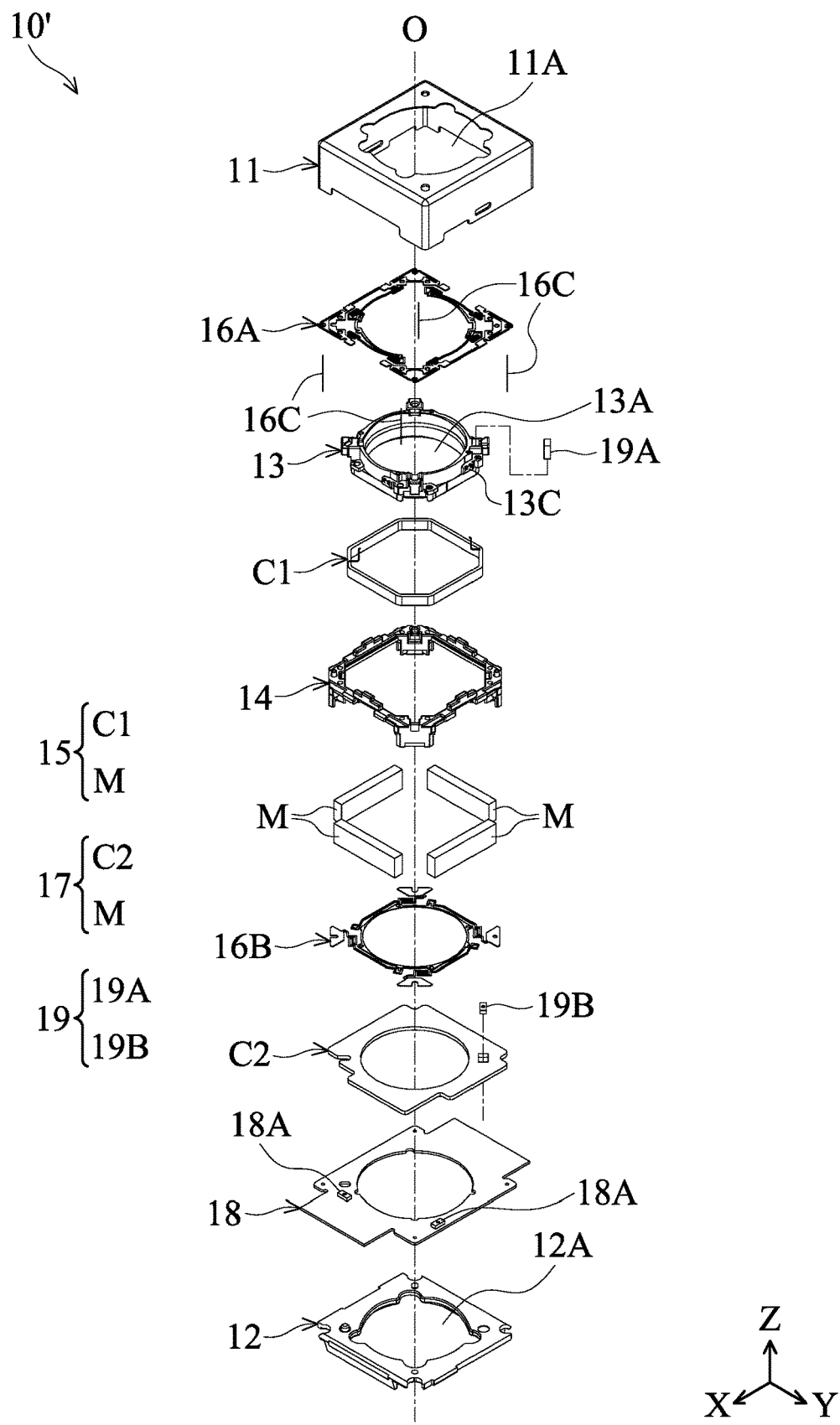
FIG. 6 is an exploded view of the optical element driving module in FIG. 5.
Figure 7:
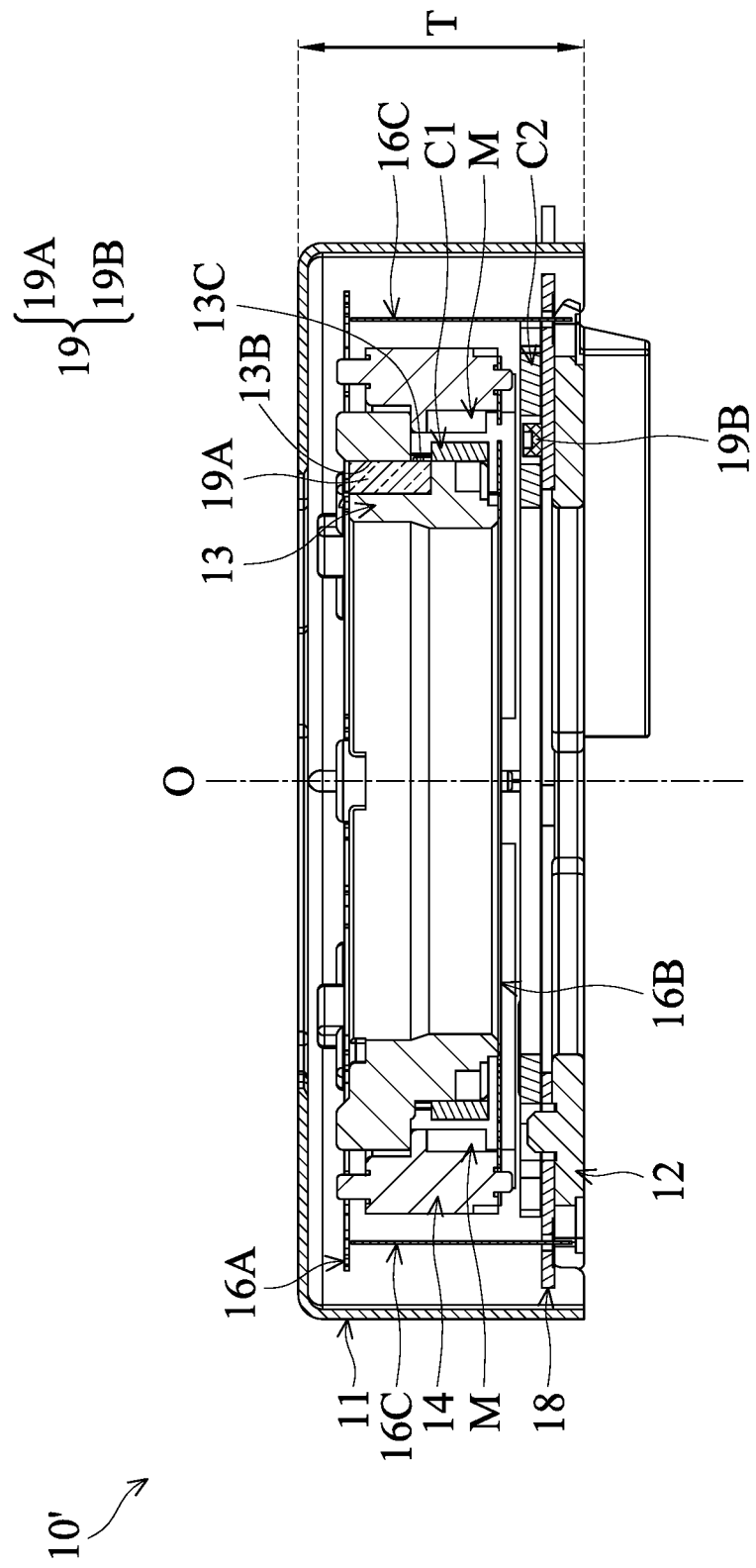
FIG. 7 is a cross-sectional view take along the line A-A' in FIG. 5.

Referring to FIG. 6 and FIG. 7, the optical element driving module 10' according to some embodiments includes a top casing 11, a base 12, a holder 13, a frame 14, a first driving mechanism 15, multiple elastic members 16A, 16B and 16C, a second driving mechanism 17, a circuit substrate 18, and a position sensing assembly 19. It should be understood that the top casing 11, base 12, circuit substrate 18, position sensing assembly 19 and the image sensing module 20 (FIG. 5) belong to a fixed part of the optical element driving device 1', and the base 12 and holder 13 belong to a movable part of the optical element driving device 1' that can be driven by the first driving mechanism 15 and second driving mechanism 17. The structure and function of the parts/elements of the optical element driving module 10' will be described in detail with reference to the accompanying drawings, and the variations of some embodiments are discussed.

The top casing 11 and the base 12 may be combined with each other and used to receive other parts/elements of the optical element driving module 10' as described above. The top casing 11 has an opening 11A through which the lens (not shown) in the optical element driving module 10' can capture light from the outside. The opening 11A and another opening 12A on the base 12 correspond to each other and are located on the optical axis O of the lens. Accordingly, the lens and the image sensing element 210 of the image sensing module 20 on a side (near the base 12) of the optical element driving module 10' can perform image focusing in the direction of the optical axis O.

The holder 13 has a through hole 13A for receiving the lens. In accordance with some embodiments, the through hole 13A forms a thread structure corresponding to another thread structure on the periphery of the lens, such that the lens can be screwed into the through hole 13A. In accordance with some embodiments, the shape of the holder 13 is quadrilateral, octagonal, or other optional polygons. The frame 14 has a hollow annular structure and the holder 13 is disposed in the frame 14. In accordance with some embodiments, the shape of the frame 14 is quadrilateral, octagonal, or other optional polygons.

The first (electromagnetic) driving mechanism 15 includes a driving coil C1 (first driving coil) and multiple (e.g. four) driving magnetic elements M (e.g. magnets). The driving coil C1 is wound around the outer peripheral surface of the holder 13. In the embodiments of FIG. 6, the driving magnetic elements M are elongated and disposed on four sides of the octagonal frame 14 to correspond to the driving coil C1. More specifically, two driving magnetic elements M are arranged parallel to the X-axis direction in the figure, and the other two driving magnetic elements M are arranged parallel to the Y-axis direction in the figure. In accordance with some embodiments, the driving magnetic elements M may be triangular or trapezoidal and disposed at four corners of the frame 14. In accordance with some embodiments, the positions of the driving coil C1 and the driving magnetic elements M may also be exchanged, that is the driving coil C1 may be disposed on the frame 14 and the driving magnetic elements M may be disposed on the holder 13.

With the above configuration, when a driving signal (e.g. current) from an external driving unit (not shown) is supplied to the driving coil C1, the driving coil C1 can act with the magnetic field from the driving magnetic elements M to generate an electromagnetic force to drive the holder 13 and the lens therein to move along the optical axis O (first direction) with respect to the frame 14 and the base 12, thereby performing image focusing.

Moreover, the holder 13 may be disposed between the elastic members 16A and 16B (for example, two metal sheets) comprising an elastic material and movably suspended at the center of the frame 14 by the elastic members 16A and 16B. For example, the outer peripheral portions of the elastic members 16A and 16B are respectively connected to the upper and lower sides of the frame 14, and the inner peripheral portions of the elastic members 16A and 16B are respectively connected to the upper and lower sides of the holder 13. Thus, the elastic members 16A and 16B can provide a buffer capacity for the displacement of the holder 13 along the optical axis O and avoid damage to the holder 13 and the lens therein.

The circuit substrate 18 may be a FPC and fixedly disposed on the base 12. Also, the circuit substrate 18 electrically connects to an external driving unit (not shown) outside the optical element driving module 10' and can be used to perform optical image stabilization (OIS) and auto-focus (AF) functionality which will be further described later.

Multiple (e.g. four) elastic members 16C may be flexible metal wires. One end of each elastic member 16C is connected to the circuit substrate 18, and the other end is connected to the elastic member 16A which connects to the upper side of the frame 14. In this way, the elastic members 16C can suspend the frame 14 and the holder 13 and lens therein above the base 12.

The second (electromagnetic) driving mechanism 17 includes a driving board C2 and the driving magnetic elements M described above (that is, the driving magnetic elements M are shared components of the first driving mechanism 15 and the second driving mechanism 17). The driving board C2 may be a FPC and fixed disposed on the circuit substrate 18 and electrically connected thereto. In the embodiments of FIG. 6, the driving board C2 is rectangular and has multiple (e.g. four) driving coils (second driving coils) therein. The positions of the four second driving coils respectively correspond to the positions of the four driving magnetic elements M, wherein two second driving coils located on opposite sides of the driving board C2 may be parallel to X-axis direction, and two second driving coils located on other opposite sides of the driving board C2 may be parallel to Y-axis direction.

Moreover, two magnetic field sensing elements 18A are respectively mounted on two sides of the circuit substrate 18 extending in the X-axis and Y-axis directions. The magnetic field sensing elements 18A may be Hall sensors, MR sensors, or Fluxgate sensors, and can be used to detect the magnetic field strength change caused by movement of the driving magnetic elements M on the frame 14, thereby determining the position offset amount of the frame 14 and the holder 13 and lens therein with respect to the base 12 in the X-axis and Y-axis directions. Furthermore, when a driving signal (e.g. current) from an external driving unit (not shown) is supplied to the second driving coils of the driving board C2 through the circuit substrate 18, an electromagnetic force generated between the second driving coils and the driving magnetic elements M can drive the frame 14 and the holder 13 therein to move along at least one (second) direction (the X-axis direction and/or the Y-axis direction) perpendicular to the optical axis O to compensate for the position offset described above. As a result, the OIS function is achieved.

In the embodiments of FIGS. 6 and 7, the position sensing assembly 19 includes a magnetic element 19A and a magnetic field sensing element 19B. The magnetic element 19A may be a magnet and fixedly disposed in a recess 13B on the outer peripheral surface of the holder 13 (but the invention is not limited thereto, and the magnetic element 19A may also be disposed on the frame 14 in some embodiments). The magnetic field sensing element 19B is disposed on the circuit substrate 18 and electrically connected thereto. The position of the magnetic field sensing element 19B corresponds to position of the magnetic element 19A. In accordance with some embodiments, the holder 13 has a protrusion 13C on the outer peripheral surface thereof. The driving coil C1 is disposed on a side (e.g. lower side) of the protrusion 13C, and the protrusion 13C is located between the magnetic element 19A and the magnetic field sensing element 19B (see FIG. 7).

In accordance with some embodiments, the magnetic field sensing element 19B is a GMR sensor or a TMR sensor and can be used to detect the magnetic field strength change caused by movement of the magnetic element 19A on the holder 13, thereby determining the amount of displacement of the holder 13 and the lens therein along the optical axis O with respect to the base 12. In other words, when the holder 13 moves back and forth along the optical axis O, the magnetic field sensing element 19B can detect the change in the magnetic field strength (i.e. the change in magnetic flux density) from the magnetic element 19A, so as to determine the position of the holder 13 on the optical axis O.

Although not shown in the drawings, the circuit substrate 18 may electrically connect to the driving coil C1 on the holder 13 via the elastic members 16C and 16A in some embodiments. Accordingly, the external driving unit (not shown) can further control the movement of the holder 13 along the optical axis O based on the sensing result of the magnetic field sensing element 19B, thereby achieving autofocus (AF).

It should be appreciated that, in the embodiments of FIGS. 6 and 7, the magnetic field sensing element 19B for sensing the position of the holder 13 carrying the lens on the optical axis O is disposed on the circuit substrate 18 (fixed part), so that the weight of movable part of the optical element driving device 1' and the consumption of driving energy can be reduced (compared to conventional technology), improving the performance of the optical element driving device 1'. Moreover, since the magnetic field sensing element 19B is directly electrically connected to the circuit substrate 18, it is not necessary to provide a corresponding circuit on the movable part. As a result, the wiring layout is simplified and the manufacturing difficulty of the optical element driving device 1' is reduced.

Figure 8:
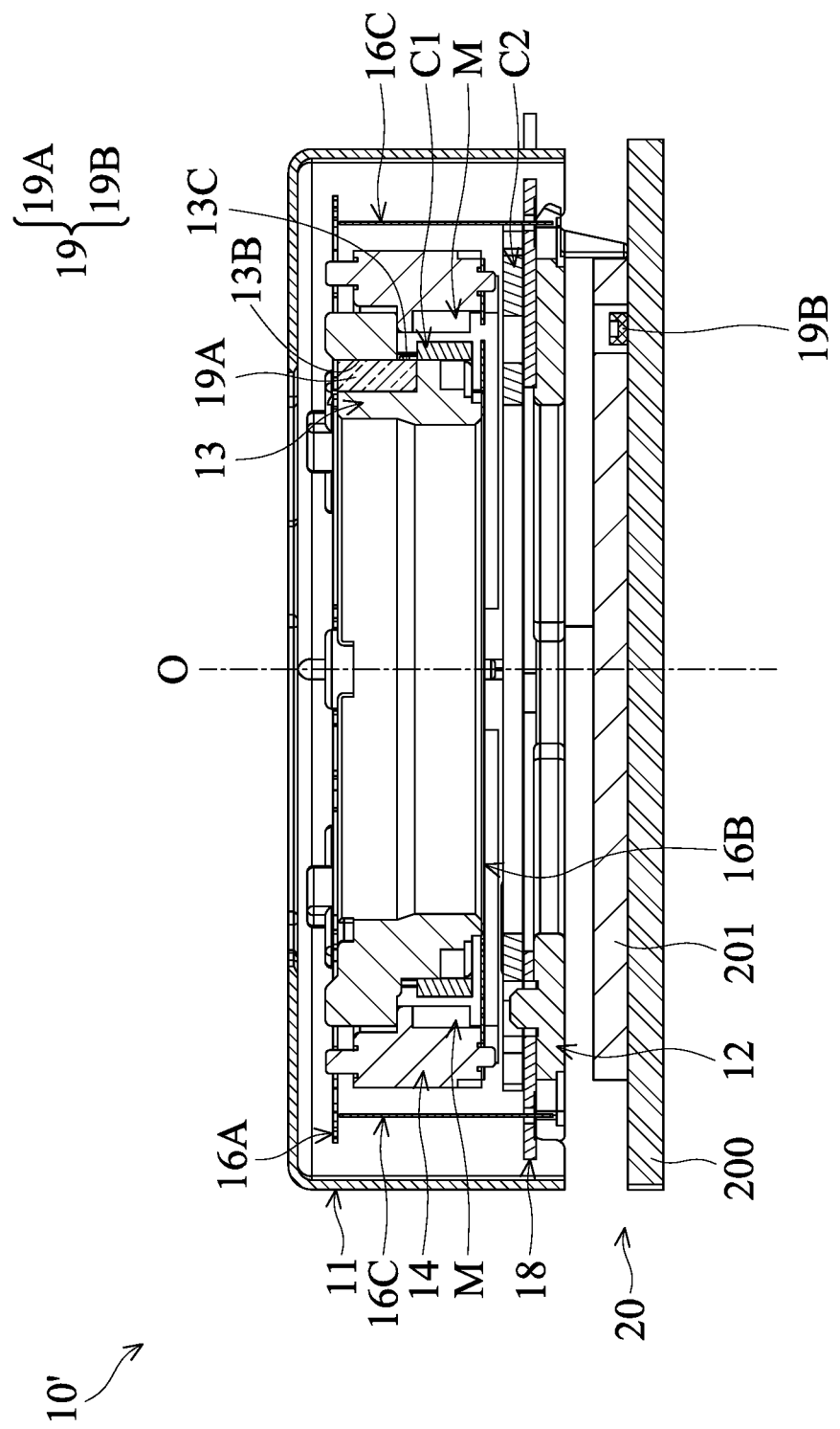
FIG. 8 is a schematic view showing that the magnetic field sensing element is disposed on the image sensing module in accordance with some embodiments.

In accordance with some embodiments, the magnetic field sensing element 19B may also be disposed on the circuit substrate 200 of the image sensing module 20 and electrically connected thereto (see FIG. 8), to reduce the weight of movable part of the optical element driving device 1', reduce the consumption of driving energy and simplify the wiring layout as described above.

Furthermore, the magnetic field sensing element 19B using a TMR sensor or a TMR sensor also has the following advantages: The sensing sensitivity of the GMR sensor or TMR sensor is several times the sensing sensitivity of the traditional Hall sensor. In addition, the GMR sensor or TMR sensor may also detect the movement of the holder 13 with respect to the base 12 by sensing the change in the magnetic field direction from the magnetic element 19A.

Figure 9:
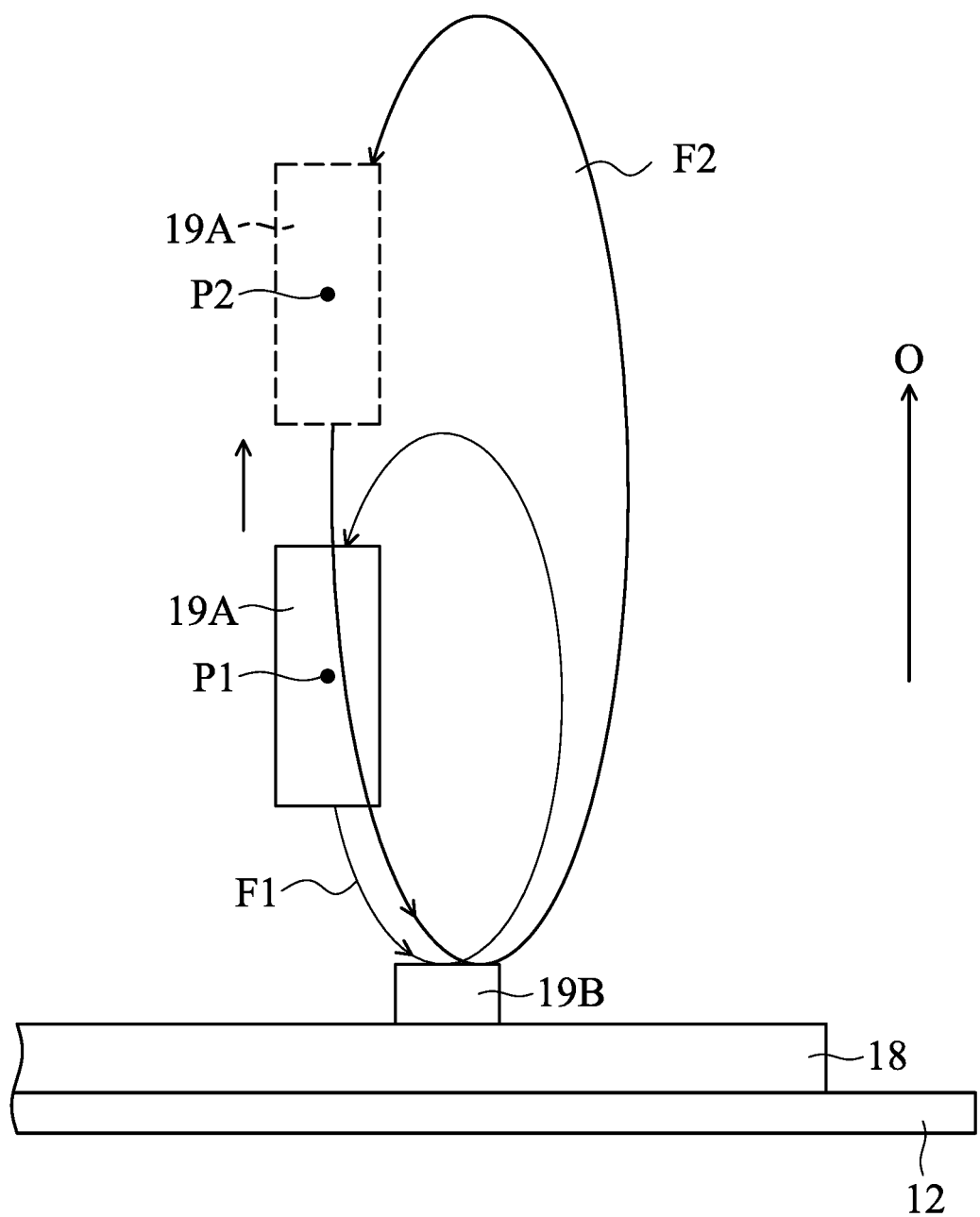
FIG. 9 is a schematic view showing that the magnetic field sensing element can sense changes in the direction of the magnetic field from the magnetic element.

As shown in FIG. 9, if the magnetic element 19A on the holder 13 and the magnetic field sensing element 19B are not aligned well or not overlapped in the direction of the optical axis O (i.e. the Z-axis direction), the magnetic field sensing element 19B may also detect the change in the magnetic field direction (for example, from the magnetic line F1 to the magnetic line F2) caused by movement (for example, from the position P1 to the position P2) of the magnetic element 19A along the optical axis O, so as to determine the amount of displacement of the magnetic element 19A and the holder 13 along the optical axis O with respect to the base 12. Therefore, when the magnetic element 19A on the holder 13 and the magnetic field sensing element 19B are not aligned well or not overlapped in the direction of the optical axis O, the magnetic field sensing element 19B can detect the changes in the strength and direction of the magnetic field from the magnetic element 19A, so that the sensing accuracy is increased.

Moreover, as shown in FIG. 7, when the magnetic element 19A on the holder 13 and the magnetic field sensing element 19B are not overlapped in the direction of the optical axis O, the height T of the optical element driving module 10' is also reduced and thus the miniaturization is achieved.

Figure 10A:
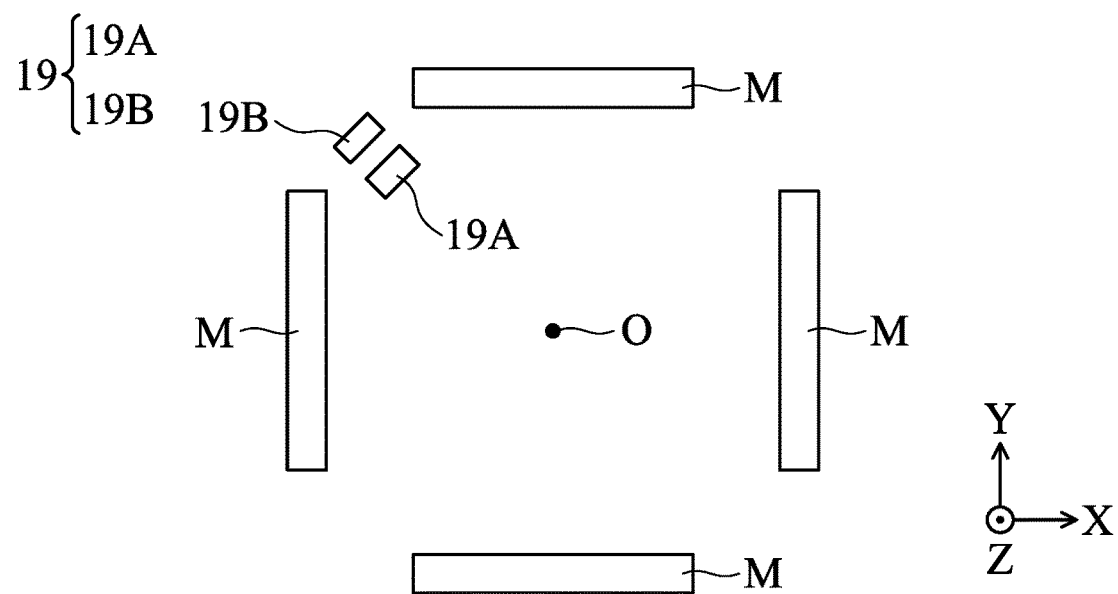
FIGS. 10A and 10B are, respectively, schematic views showing the relative position of the driving magnetic elements, the magnetic element and the magnetic field sensing element when viewed along the optical axis of the optical element in accordance with some embodiments.
Figure 10B:
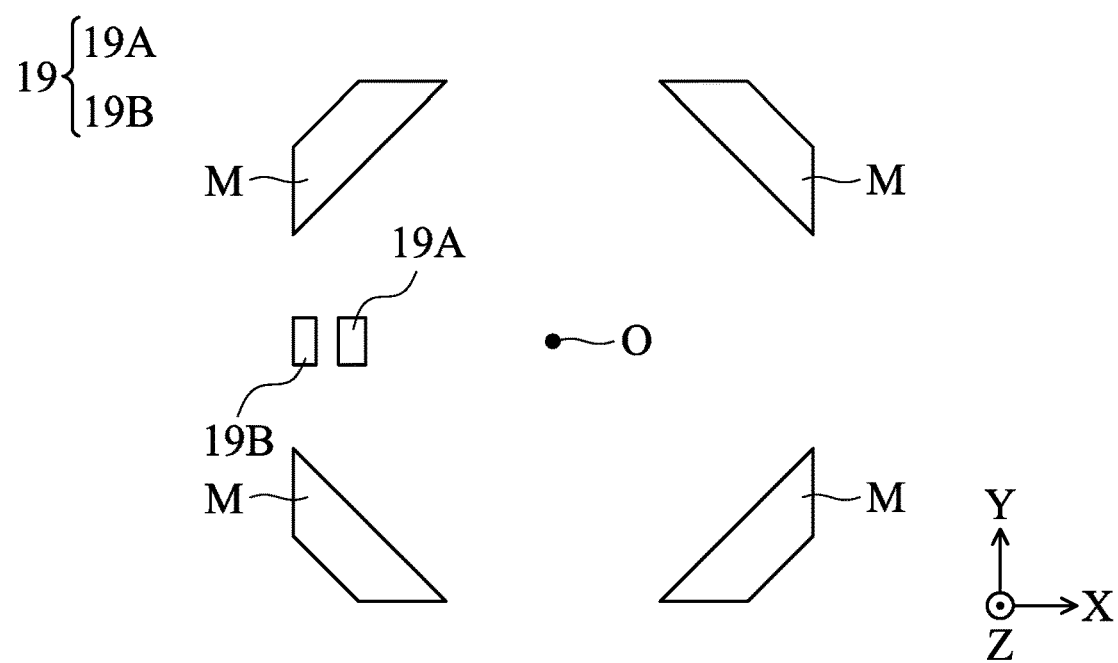

FIGS. 10A and 10B are, respectively, schematic views showing the relative position of the driving magnetic elements M, the magnetic element 19A and the magnetic field sensing element 19B when viewed along the optical axis O of the lens in accordance with some embodiments. It should be first understood that the driving magnetic elements M and the magnetic element 19A are partially overlapped (in order to make the device thinner) when viewed from a direction that is perpendicular to the optical axis O and thus magnetic interference between the driving magnetic elements M and the magnetic element 19A is likely to occur, causing the focus speed and accuracy of the optical element driving module 10' to be reduced and the sensing accuracy of the magnetic field sensing element 19B to be adversely affected. Therefore, the driving magnetic elements M and the magnetic element 19A are preferably arranged so as to not overlap in the direction of the optical axis O.

As shown in FIG. 10A, when viewed along the optical axis O, multiple elongated driving magnetic elements M may be arranged on four sides of the substantially rectangular base 12 (not shown) and the magnetic element 19A and magnetic field sensing element 19B may be arranged at a corner of the base 12 (wherein the magnetic element 19A is closer to the lens than the magnetic field sensing element 19B, and they do not overlap). As shown in FIG. 10B, when viewed along the optical axis O, multiple trapezoidal driving magnetic elements M may be arranged at four corners of the substantially rectangular base 12 (not shown) and the magnetic element 19A and magnetic field sensing element 19B may be arranged on a side of the base 12.

Additionally, in order to further reduce the magnetic interference between the driving magnetic elements M and the magnetic element 19A, embodiments of the invention also provide various technical means as described below.

Figure 11A:
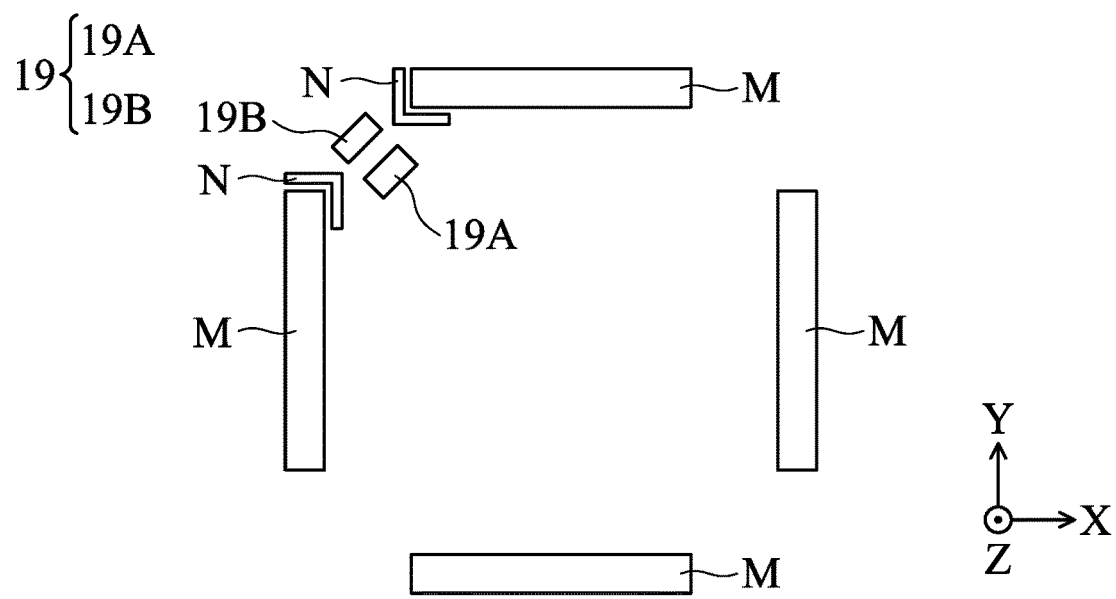
FIGS. 11A to 11D are, respectively, schematic views showing various means for reducing the magnetic interference between the driving magnetic elements and the magnetic element in accordance with some embodiments.

As shown in FIG. 11A, a magnetic isolation member (or shield) N may be provided between the adjacent driving magnetic element M and the magnetic element 19A in some embodiments. The magnetic isolation member N may comprise a magnetic conductive material (such as nickel-iron alloy) and can be used to avoid leakage of the magnetic lines of the driving magnetic element M and the magnetic element 19A.

Figure 11B:
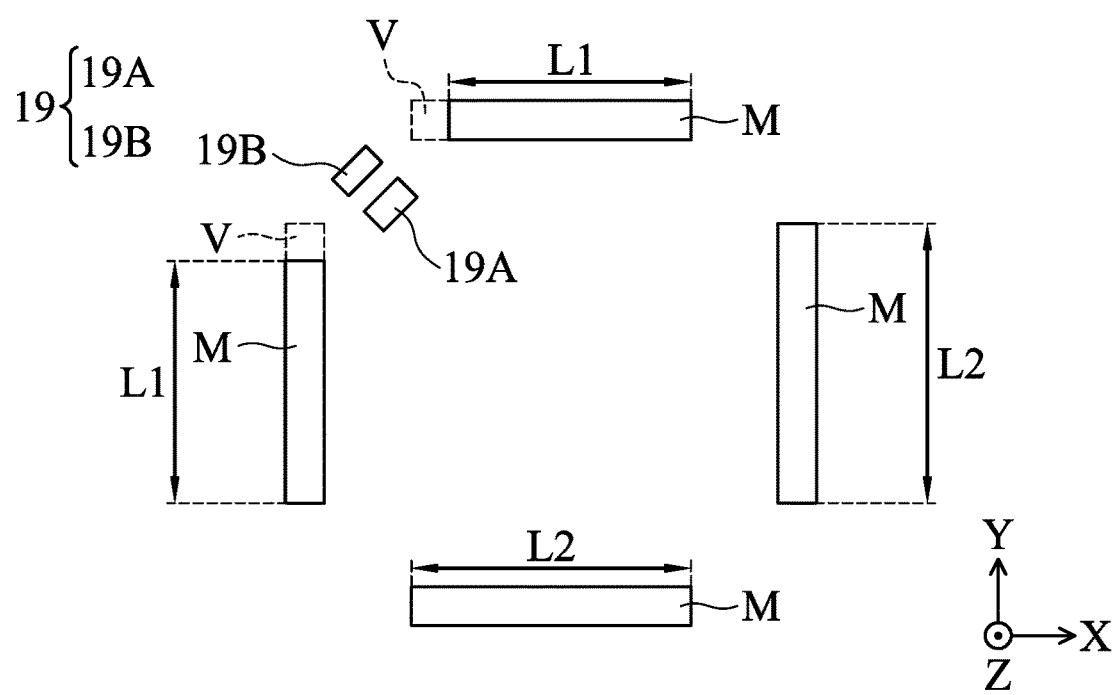
Figure 11C:
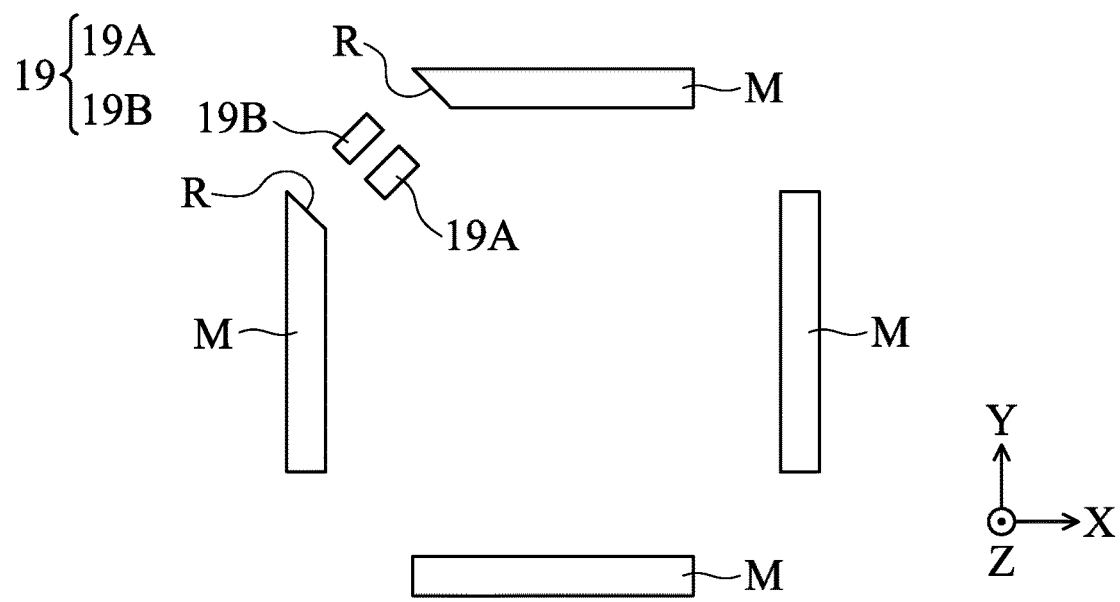

As shown in FIG. 11B, the length L1 of the driving magnetic elements M near the magnetic element 19A may be less than the length L2 of the driving magnetic elements M away from the magnetic element 19A (i.e. different structure) in some embodiments. Alternatively, the driving magnetic elements M all have the same length, but the driving magnetic elements M near the magnetic element 19A each have a non-magnetic region U (depicted in dashed lines), i.e. not magnetized. As shown in FIG. 11C, the driving magnetic elements M all have the same length, but the driving magnetic elements M near the magnetic element 19A each have a notch R (i.e. different structure) in some embodiments.

Figure 11D:
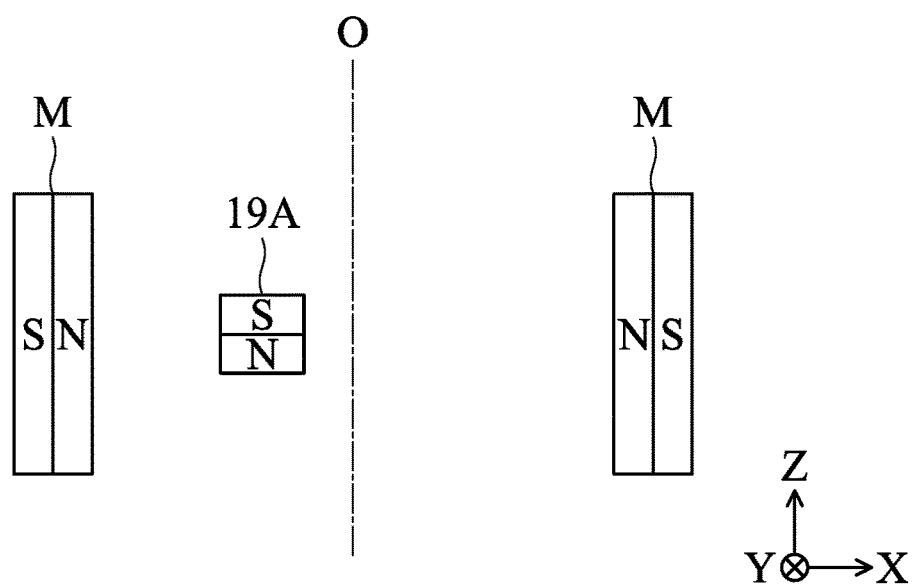

As shown in FIG. 11D, the magnetic pole direction (N-S) of the driving magnetic elements M may also be different from the magnetic pole direction (N-S) of the magnetic element 19A in some embodiments, so as to reduce the magnetic interference between the driving magnetic elements M and the magnetic element 19A. For example, the magnetic pole direction (N-S) of the magnetic element 19A may be parallel to the optical axis O and the magnetic pole direction (N-S) of the driving magnetic elements M may be perpendicular to the optical axis O. Alternatively, the magnetic pole direction (N-S) of the magnetic element 19A may be perpendicular to the optical axis O and the magnetic pole direction (N-S) of the driving magnetic elements M may be parallel to the optical axis O. In accordance with some embodiments, the magnetic pole direction (N-S) of the magnetic element 19A may also be inclined with respect to the optical axis O. In addition, the driving magnetic elements M and/or the magnetic element 19A may also be multipole magnets so that the magnetic interference therebetween can be reduced further.

Figure 12:
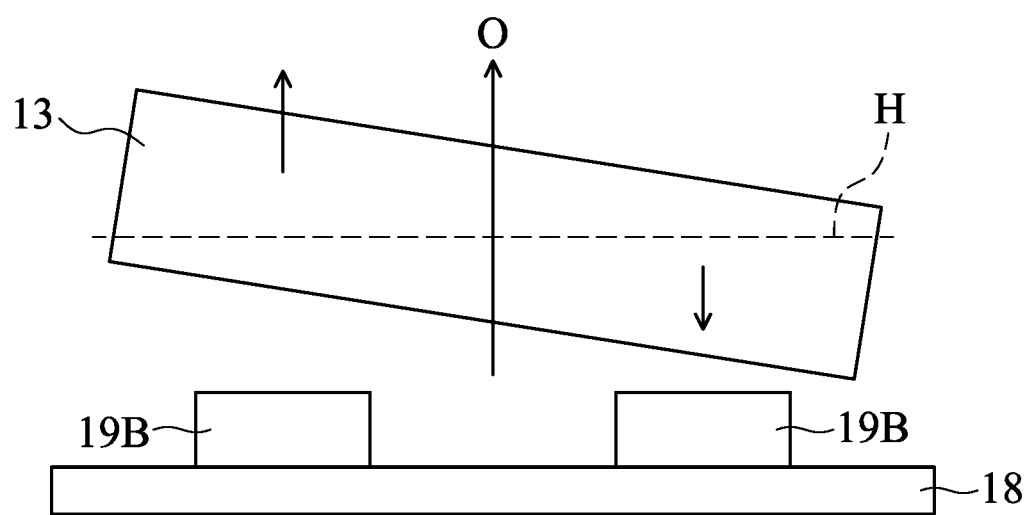
FIG. 12 is a schematic view showing that multiple magnetic field sensing elements are disposed on the fixed part to sense the tilt or rotation of the holder.

Next, referring to FIG. 12 which is a schematic view showing that multiple magnetic field sensing elements 19B are disposed on the fixed part to sense the tilt or rotation of the holder 13. It should be first understood that the magnetic element 19A (not shown in FIG. 12) of the position sensing assembly 19 is not provided at the center of gravity of the holder 13, so that the change in the strength or direction of the magnetic field of the magnetic element 19A detected by the single magnetic field sensing element 19B does not necessarily indicate the overall movement of the holder 13 but may only indicate the holder 13 has tilted or rotated (for example, the holder 13 may be tilted with respect to a horizontal plane H perpendicular to the optical axis O due to shock as shown in FIG. 12).

In order to overcome this noise interference problem and improve the sensing accuracy, multiple magnetic field sensing elements 19B may be disposed on the fixed part (e.g. the circuit substrate 18) of the optical element driving device 1' to respectively sense the amount of displacement of multiple portions (provided with multiple magnetic elements 19A corresponding to the magnetic field sensing elements 19B) of the holder 13 in the same direction (e.g. the direction of optical axis O) with respect to the base 12 (see FIG. 12), and then the information sensed by the magnetic field sensing elements 19B is calculated and analyzed to determine the real movement of the holder 13.

Figure 13A:
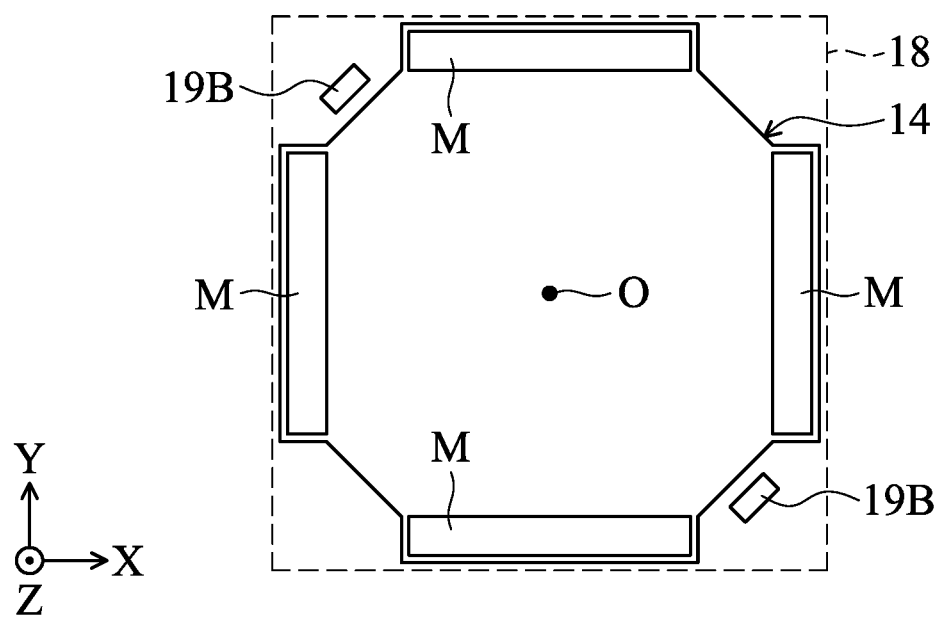
FIGS. 13A and 13B are, respectively, schematic views showing the relative position of the magnetic field sensing elements and the movable part when viewed along the optical axis of the optical element in accordance with some embodiments.
Figure 13B:
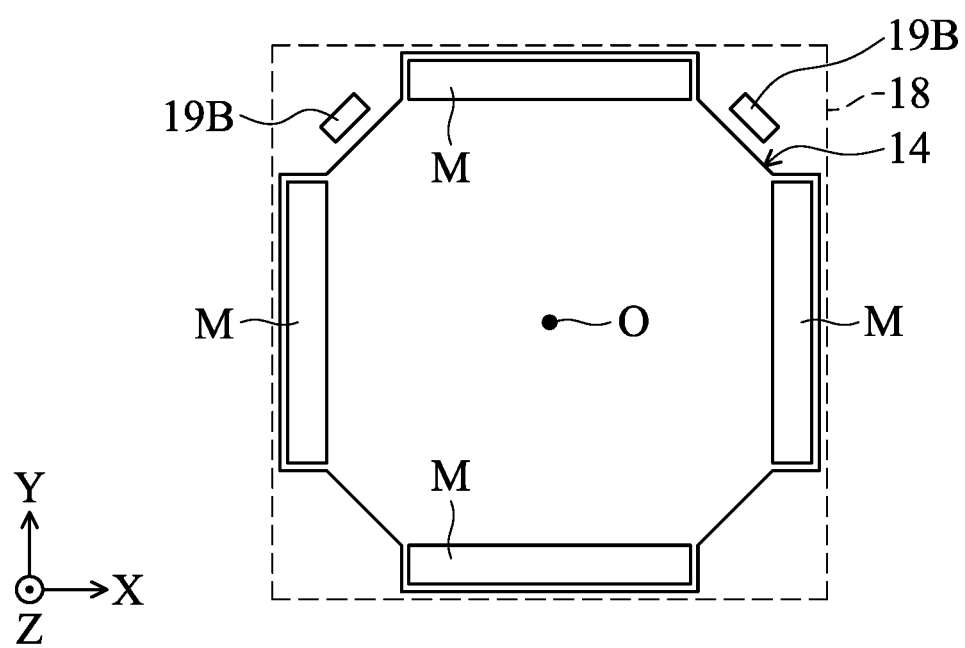

In accordance with some embodiments (as shown in FIG. 13A), multiple (e.g. two) magnetic field sensing elements 19B may be disposed at two opposite corners of the circuit substrate 18 (corresponding to two opposite corners of the frame 14) and arranged in a direction not parallel to the X-axis direction in the figure, for example. In accordance with some embodiments (as shown in FIG. 13A), multiple (e.g. two) magnetic field sensing elements 19B may be disposed at two adjacent (i.e. on the same side) corners of the circuit substrate 18 (corresponding to two adjacent corners of the frame 14) and arranged in a direction parallel to the X-axis direction in the figure, for example.

In accordance with some embodiments, the above magnetic field sensing elements 19B may each include multiple magnetic field sensing subunits (e.g. GMR sensors or TMR sensors) in its package. The magnetic field sensing subunits can be used to sense the amount of displacement of the holder 13 in different directions (e.g. at least two of the X-axis direction, the Y-axis direction and the Z-axis direction). Accordingly, the magnetic field sensing elements 19B may be substituted for the magnetic field sensing elements 18A on the circuit substrate 18 and the number of elements in the optical element driving module 10' is reduced.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving device, comprising:
   a fixed part including a base;
   a movable part including a holder for carrying an optical element;
   a first driving mechanism configured to drive the holder to move along a first direction with respect to the base; and
   a position sensing assembly including a magnetic element and a magnetic field sensing element in corresponding positions and configured to sense the amount of displacement of the holder along the first direction with respect to the base,
   wherein a second direction is perpendicular to the first direction, and a third direction is perpendicular to the first direction and the second direction, the magnetic field sensing element and the magnetic element are arranged in the second direction when viewed from the first direction, and the magnetic field sensing element does not overlap the magnetic element when viewed along the second direction and the third direction.

2. The optical element driving device as claimed in claim 1, wherein the first driving mechanism includes a first driving coil and a driving magnetic element in corresponding positions, the magnetic element has two magnetic poles aligned in a magnetic pole direction, and the magnetic pole direction of the driving magnetic element is different from that of the magnetic element.

3. The optical element driving device as claimed in claim 1, wherein the fixed part further includes an image sensing module including a circuit substrate and an image sensing element, and the image sensing element and the magnetic field sensing element are disposed on the circuit substrate.

4. The optical element driving device as claimed in claim 1, wherein the first driving mechanism includes a first driving coil and a driving magnetic element in corresponding positions, and wherein the holder has a protrusion on an outer peripheral surface of the holder, the first driving coil is disposed on a side of the protrusion, and the protrusion is located between the magnetic element and the magnetic field sensing element.

5. The optical element driving device as claimed in claim 1, wherein the magnetic field sensing element is a Giant Magneto Resistance sensor or a Tunneling Magneto Resistance sensor.

6. The optical element driving device as claimed in claim 1, wherein the magnetic field sensing element determines the amount of displacement of the holder with respect to the base by sensing changes in the direction of the magnetic field from the magnetic element.

7. The optical element driving device as claimed in claim 6, wherein the magnetic element and the magnetic field sensing element do not overlap when viewed along the first direction.

8. The optical element driving device as claimed in claim 6, wherein the position sensing assembly further includes a plurality of magnetic elements and a plurality of magnetic field sensing elements in corresponding positions, wherein the magnetic field sensing elements are arranged in a second direction that is different from the first direction, and the magnetic field sensing elements are respectively configured to sense an amount of displacement of a plurality of portions of the holder in the first direction with respect to the base.

9. The optical element driving device as claimed in claim 6, wherein the first driving mechanism includes a first driving coil and a driving magnetic element in corresponding positions, and the magnetic field sensing element and the magnetic element are partially overlapping when viewed from a direction that is perpendicular to the first direction.

10. The optical element driving device as claimed in claim 9, wherein the base is rectangular, the driving magnetic element is located on a side of the base, and the magnetic element is located at a corner of the base.

11. The optical element driving device as claimed in claim 9, wherein the base is rectangular, the driving magnetic element is located at a corner of the base, and the magnetic element is located on a side of the base.

12. The optical element driving device as claimed in claim 9, wherein the first driving mechanism further includes a plurality of driving magnetic elements, and the driving magnetic elements comprises a first driving magnetic element and a second driving magnetic element having different shapes, and a distance between the first driving magnetic element and the magnetic element is different from a distance between the second driving magnetic element and the magnetic element.

13. The optical element driving device as claimed in claim 6, wherein the magnetic field sensing element is disposed on the base to sense the amount of displacement of the holder along the first direction with respect to the base, and the first direction is parallel to an optical axis of the optical element.

14. The optical element driving device as claimed in claim 13, wherein the first driving mechanism includes a first driving coil and a driving magnetic element, the optical element driving device further comprises a second driving mechanism including a second driving coil and the driving magnetic element in corresponding positions, wherein the second driving coil is disposed on the fixed part, the driving magnetic element is disposed on the movable part, and the second driving mechanism is configured to drive the movable part to move along a second direction with respect to the base, wherein the second direction is different from the first direction.

15. The optical element driving device as claimed in claim 14, wherein the fixed part further includes a circuit substrate disposed on the base, and the second driving coil and the magnetic field sensing element are disposed on the circuit substrate.

16. An optical element driving device, comprising:
   a fixed part including a base;
   a movable part including a holder for carrying an optical element;
   a first driving mechanism including a first driving coil and a driving magnetic element in corresponding positions and configured to drive the holder to move along a first direction with respect to the base; and a position sensing assembly including a magnetic element and a magnetic field sensing element in corresponding positions and configured to sense the amount of displacement of the holder along the first direction with respect to the base, wherein a second direction is perpendicular to the first direction, and a third direction is perpendicular to the first direction and the second direction, the magnetic field sensing element and the magnetic element are arranged in the second direction when viewed from the first direction the magnetic field sensing element does not overlap the magnetic element when viewed along the second direction and the third direction.

17. The optical element driving device as claimed in claim 16, wherein the magnetic element has two magnetic poles aligned in a magnetic pole direction, the magnetic pole direction of the driving magnetic element is different from the first direction.

18. The optical element driving device as claimed in claim 16, wherein the magnetic element is disposed on the holder, and the magnetic field sensing element is disposed on the base.

19. The optical element driving device as claimed in claim 18, wherein the magnetic field sensing element includes a package body having a top surface and a mounting surface opposite to each other, and the mounting surface is connected to the base, wherein the magnetic field sensing element is configured to sense the magnetic element's magnetic field strength changes parallel to the top surface.

20. The optical element driving device as claimed in claim 18, wherein the magnetic element and the magnetic field sensing element do not overlap when viewed along the first direction.

* * * * *